United States Patent
Willinger et al.

Patent Number: 5,137,433
Date of Patent: Aug. 11, 1992

[54] AQUARIUM POWER HEAD WITH INTEGRAL MUFFLER

[75] Inventors: Allan H. Willinger, Franklin Lakes; Robert Ellis, Wyckoff, both of N.J.

[73] Assignee: Willinger Bros., Inc., Oakland, N.J.

[21] Appl. No.: 531,917

[22] Filed: May 29, 1990

[51] Int. Cl.⁵ .................. F04B 21/06; F04B 17/04
[52] U.S. Cl. ............................. 417/312; 417/424.1
[58] Field of Search .......... 417/312, 84, 89, 423.9, 417/423.15, 424.1; 210/416.2; 181/229, 264, 270, 404

[56] References Cited

U.S. PATENT DOCUMENTS

| | | | |
|---|---|---|---|
| 2,392,247 | 1/1946 | Katcher | 181/270 |
| 2,782,425 | 2/1957 | Schroeter | 417/423.15 |
| 3,092,206 | 6/1963 | Moreau | 181/270 |
| 3,838,944 | 10/1974 | Kalfertz | 417/312 |
| 4,330,239 | 5/1982 | Gannaway | 417/210 |
| 5,011,600 | 4/1991 | Mowka et al. | 210/416.2 |

Primary Examiner—John J. Vrablik
Assistant Examiner—Alfred Basichas
Attorney, Agent, or Firm—Helfgott & Karas

[57] ABSTRACT

A water pump assembly for an aquarium aeration system includes a housing surrounding an electric pump. Within the housing, a water conduit passes an impeller of the pump for the generation of a stream of moving water. An air-breather conduit conducts air from a location above the housing to an air-induction port in a sidewall of the water conduit wherein the moving water produces a venturi action for drawing in air and entraining the air as a series of bubbles in the stream of water. The process of mixing air with the water produces sound. A muffler disposed on top of the housing is connected serial with the air-breather conduit for attenuating the sound to permit a viewing of the aquarium without the distraction of the sound. A valve may be located on an air inlet port above the muffler for adjusting a rate of flow of the air. The muffler incorporates a serpentine corridor for conduction of the air, the corridor comprising a set of baffles or a set of arcuate passages of sufficiently small cross-sectional dimensions for attenuating the sound. The muffler is constructed in different embodiments, each of which may be opened manually for cleaning.

28 Claims, 7 Drawing Sheets

AQUARIUM POWER HEAD WITH INTEGRAL MUFFLER

BACKGROUND OF THE INVENTION

This invention relates to aquarium filtering and aerating systems and, more particularly, to an aquarium power head for drawing water through a riser tube of an aquarium undergravel filter. The power head is effectively a water pump but includes an air inlet for mixing the air with the water stream, thereby aerating the water. A muffler is formed integrally with the housing for silencing muffler is formed integrally with the housing for silencing suckingin sounds produced by the air entering the power head.

Aquariums are used widely for housing fish and other aquatic life. In order to provide a proper habitat for the aquatic life, water held within an aquarium tank is generally filtered and aerated to ensure a removal of waste matter and provide an adequate concentration of oxygen. Aeration, and filtration of waste matter can be combined using the well-known undergravel filter system in which aquarium water is drawn through aquarium gravel spaced off the bottom by a porous plastic plate at the bottom of the tank. The filtered water flows upward through a riser tube and returns to the aquarium. A water pump, generally referred to as a power head, sits on the riser tube and lifts the water up the riser tube and then emits it back to the aquarium. An air passage in the power head causes air to be sucked in as the water passes and the air becomes entrained in the water so that the filtered water returning to the aquarium is now aerated.

Power heads suitable for use with an undergravel filter may be constructed to include a pump having an impeller operated by an electric motor. Water drawn into the power head passes through a water conduit. There is also provided an air-breather conduit which is in flow communication with the water conduit via an air-induction port in a sidewall of the water conduit. By venturi action, the air is drawn from the breather conduit into the flowing water to form a series of bubbles entrained in the stream of water. The motor, the impeller, and both of the conduits are encased within a _ _ using. The housing includes water inlet and outlet ports for the water conduit, and an air inlet port for the breather conduit.

There are a number of problems which arise in the use of existing power heads. One of the problems arises from the shape of the housing of the power head. Typically, the housing is constructed with flat sidewalls. During placement of the apparatus within the aquarium tank, a sidewall of the housing is adjacent to a wall of the aquarium tank. Frequently, a wedge-shaped space develops between the walls of the housing and the tank. A fish swimming in the tank may swim into the space between the housing and a tank wall, and become trapped and suffocated by the narrowing wedge-shaped space.

Another problem arises from the process of sucking in of air into the inlet port. This causes a hissing noise as the air enters. The air then mixing with the water also causes noise. These noises cause the known power heads to be annoying and causes users to dislike their presence in the aquarium. Some power head manufacturers place a tubing at the air inlet with a cup at the end and insert some type of foam in the cup. Absorbent cotton or polyester foam are used, but when compacted they cut the air flow severely. If not compacted, they allow excessive noise. When they get wet, they completely cut off the air supply.

A further problem relates to the support for the power. Typically, a clamp or holder must be used to retain the power head over the riser tube. The holder must permit adjustment to position the power head properly. Typically, such holders are complex apparatus, which is costly, difficult to operate, and not always aesthetically acceptable.

SUMMARY OF THE INVENTION

The aforementioned problems are overcome, and other advantages are provided by a power head of the present invention to be used with an undergravel filter in an aquarium tank. The power head including the pump and fluid conduits which are housed in a housing having a substantially circular cylindrical sidewall. The substantially circular cylindrical shape avoids entrapment of a fish between the housing and the tank wall, which may contact the housing. A new clamp is provided for conveniently securing the housing at a corner of the tank with the power head held by the tank wall and conveniently positioned over the riser tube.

In order to silence the sounds produced by the sucking in and entrainment of air in the water, the invention provides for the inclusion of a muffler as a part of the air breather conduit, the muffler being located between an air inlet port and an induction port in the water conduit wherein the air is mixed into the water. The muffler is constructed in a low-profile configuration to permit a locating of the muffler within an end wall of the housing. This permits easy access by risers, by means of a removable panel in the muffler, for cleaning interior portions of the muffler.

The muffler can be constructed in a number of embodiments by use of a duct having an array of baffles enclosed within the duct to provide a circuitous path to the passage of the air. The baffles are oriented transversely of a central axis of the duct. The baffles are spaced apart from each other to define a tortuous corridor for the flow of air through the duct. In addition, the baffles can extend inwardly of the duct from different sidewalls of the duct for interdigitation of the baffles. The interdigitation can impart a serpentine form to the corridor. Thereby, as the air progresses through the duct, it undergoes continuous changes in direction which enable the inlet noise to be absorbed as it flows into the housing. Preferably, the baffles are constructed as ribs integrally formed with sidewalls of the duct, a configuration which is readily manufactured by molding plastic.

To provide for the low-profile configuration of the muffler, the duct is formed with an enclosed configuration in which one opposed pair of walls may be regarded as a floor and a roof, with sidewalls interconnecting the floor and the roof. Different embodiments of the invention provide for different patterns of the baffles to provide air passages in the forms of circuitous paths having different configurations. By way of example, alternate ones of the baffles can extend from the floor and the roof partway towards the opposite wall to provide an undulation in air passage which progresses in up and down fashion along the central axis of the duct. Alternatively, alternate ones of the baffles can extend inwardly from opposite sidewalls to provide an undulation from the air passage which progresses in a side to side fashion. The duct may have a linear form with input and output ports at opposite ends of the duct. Alternatively, a center partition may be provided within the duct to form a U-shape configuration of the passageway within the duct in which case the input and the output ports of the duct can be located coaxially to each other and extending in opposite directions from the duct. An adjustable air constriction valve may be utilized at the input port of the duct located on an exterior side of the pump housing to permit manual adjustment of an air flow rate.

By way of yet another form of construction which is employed in a preferred embodiment of the muffler, the low-profile configuration of the muffler can be obtained by constructing the circuitous sinuous corridor as a series of circular segments shaking back and forth in a concentric arrangement which interconnects inlet and outlet ports of the muffler. Successive circular segments are interconnected by U-shaped and connector segments. This provides a configuration of a passageway with numerous different radii of curvature to attenuate the noise produced by the entry of air in the housing.

In the construction of the air-inlet valve in the power head incorporating any one of the foregoing embodiments of the muffler, the air-inlet valve may be located physically at the input port of the muffler, and may be constructed of two cylindrical sections which are nested, one within the other. The outer cylindrical section includes a sidewall aperture which opens to the external environment for receiving air, and which communicates with an air conducting channel in the inner cylindrical element. By rotation of the outer cylindrical element about the inner cylindrical element, the air inlet opening of the outer cylindrical element is offset relative to the air conduction channel of the inner cylindrical element resulting in a constriction of the passage for intake of air.

There is also provided a unique clamping arrangement for clamping the power head onto the aquarium wall and permitting adjustment to position the power head over the filtration riser tube.

The entire housing is potted with epoxy or other potting compounds to permit the power head to be submerged.

BRIEF DESCRIPTION OF THE DRAWING

The aforementioned aspects and other features of the invention are explained in the following description, taken in connection with the accompanying drawing wherein.

In the various figures of the drawing like reference characters designate like parts.

DETAILED DESCRIPTION OF THE PREFERRED EMBODIMENTS

Figure 1:
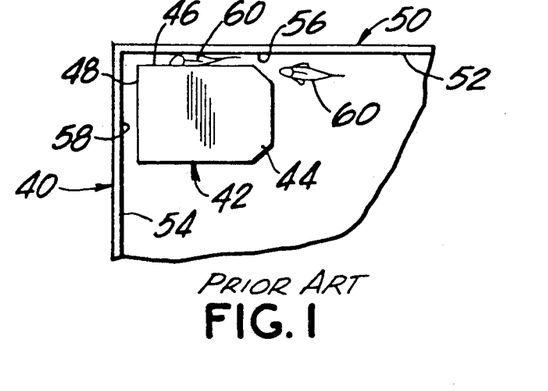
FIG. 1 shows, in plan view, a fragmentary portion of an aquarium using a power head with flat walls, in accordance with the prior art.
Figure 2:
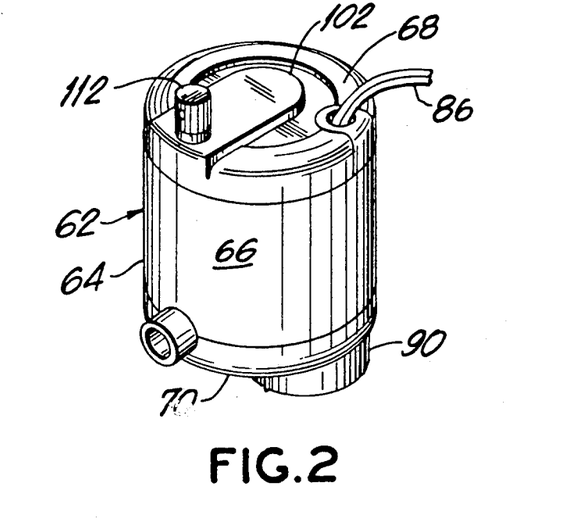
FIG. 2 shows a power head in accordance with the present invention including, circular cylindrical housing.

FIG. 1 shows a fragmentary view of an aquarium 40 including a power head 42 for use in causing a flow of the water in an undergravel filter arrangement within the aquarium 40. In accordance with the practice of the prior art, the power head 42 is partially submerged in the water, and is provided with a housing 44 having flat sidewalls such as walls 46 and 48. The aquarium 40 includes a tank 50 constructed of walls 52 and 54 for containing the water in the tank 50. Gaps 56 and 58 are typically present respectively between the housing wall 46 and the tank wall 52, and between the housing wall 48 and the tank wall 54. Fish 60, while swimming in the water, may become entrapped in one of the gaps, such as the gap 56, by being wedged between the walls 46 and 52. This presents a hazard to the fish.

Figure 3:
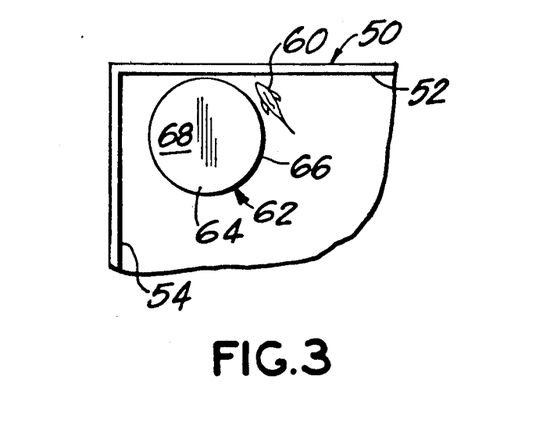
FIG. 3 shows a plan view of an aquarium, similar to the view of FIG. 1, but including the power head having a circular cylindrical housing, in accordance with a feature of the present invention.
Figure 4:
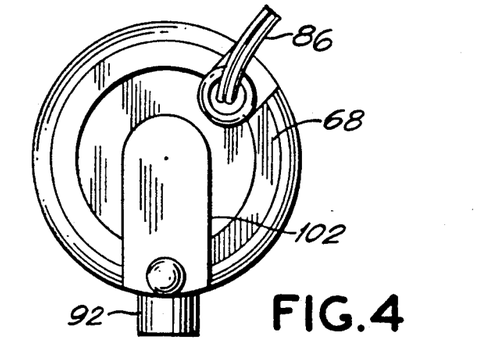
FIG. 4 is a top plan view of the housing of FIG. 2, the view including a muffler located on a top surface of the housing.
Figure 5:
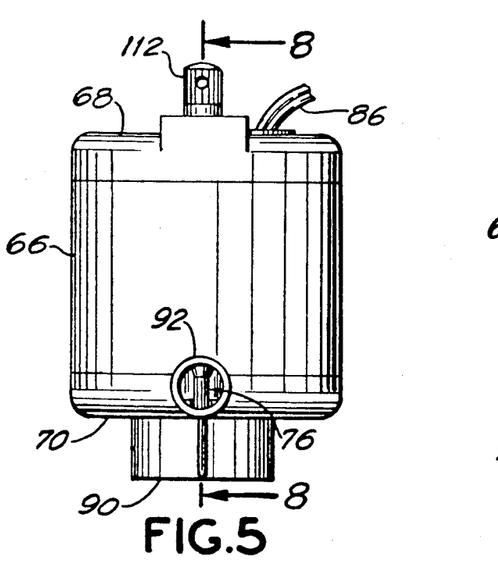
FIG. 5 is a front elevation view of the power head of FIG. 2, the view being directed along an axis of an exit port for the aerated water.
Figure 6:
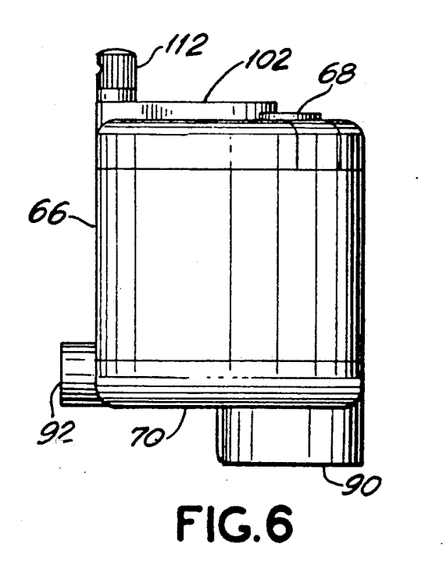
FIG. 6 is a side elevation view of the power head of FIG. 2.
Figure 7:
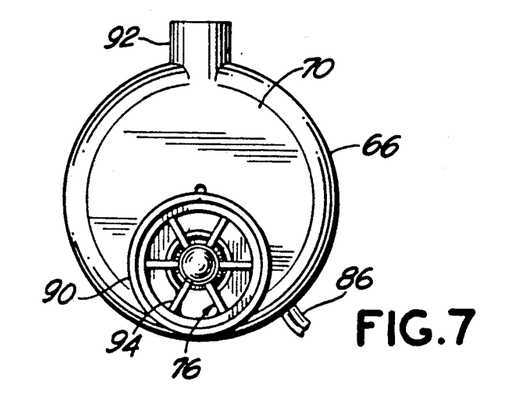
FIG. 7 is a bottom view of the power head FIG. 2.

FIGS. 2-9 show a power head 62 constructed within a housing 64 which, in accordance with a feature of the invention, is formed with a sidewall 66 having a circular cylindrical surface. The housing 64 is closed off by end walls, namely, a top wall 68 and a bottom wall 70. As shown in FIG. 3, the power head 62 is slightly spaced from the tank wall 54. In this case, however, because of the cylindrical configuration of the housing, there is no parallel wall between the power head and the tank wall, but only a tangential contact. As a result, the curvature of the sidewall 66 inhibits a wedging and entrapment of the fish 60 between the sidewall 66 and the tank wall 52.

The power head 62 includes a pump 72 (FIGS. 8 and 9) comprising an electric motor 74 and an impeller 76 which is rotated by the motor 74. The motor 74 is constructed in well-known fashion and includes a rotor 78 and a stator 80. The stator so includes a winding 82 disposed on laminae 84 of magnetic material, such as iron. Upon excitation of the winding 82 with electric current, the stator so produces a alternating magnetic field which imparts rotation to the rotor 78 and to the impeller 76 mechanically coupled to the rotor 78. Electric current for the motor 74 is provided by a pair of electric wires 86 entering into the housing 64 via the top wall 68.

Figure 8:
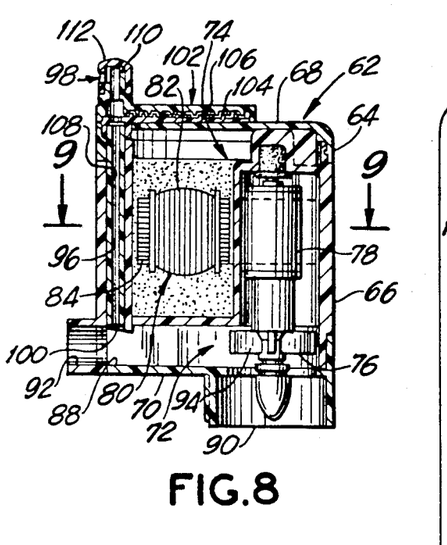
FIG. 8 is a sectional view of the power head of FIG. 2, taken along an elevation plane through the water outlet port, the view showing interior components of the pump assembly including an electric motor and impeller driven by the motor.
Figure 9:
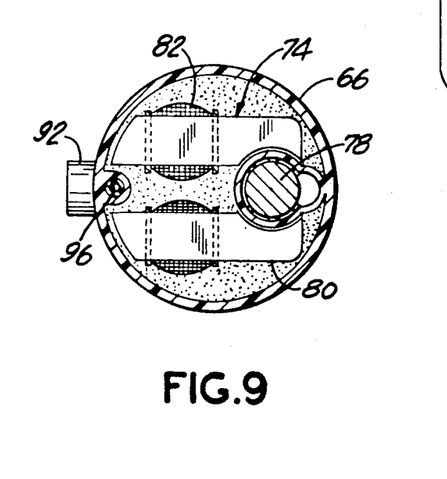
FIG. 9 is a transverse sectional view of the pump assembly taken along the line 9—9 of FIG. 8.

The power head 62 includes a water conduit 88 extending from a water inlet port 90 from the housing 64 to a water outlet port 92 of the housing 64. The inlet port 90 is located on the bottom wall 70 and opens in the downward direction for drawing in water from the tank 50. The outlet port 92 is located at the bottom of the sidewall 66, and opens in the horizontal direction for directing an outgoing stream of water to return back to the aquarium tank 50. The impeller 76 may be disposed coaxially with the inlet port 90. The impeller 76 includes a set of radially extending vanes 94 located within the water conduit 88. Upon rotation of the impeller 76, the vanes 94 urge the water to flow through the conduit 88.

Also included within the pump housing 64 is an air-breather conduit 96 which extends from an air inlet port 98 at the top of the housing 64 to an air induction port 100 located on a sidewall of the water conduit 88. In response to the flowing stream of water in the conduit 88, the induction port 100 acts as a venturi for drawing air from the breather Conduit 96 into the water of the conduit 88. The air drawn into the water appears as a stream of bubbles entrained in the stream of water exiting the conduit 88 at the outlet port 92. The process of drawing air to the water, causes air to be sucked into the air inlet port 98 which produced a noise as the air enters. The sound is objectionable and a source of distraction to persons observing aquatic life in a home aquarium 40.

In accordance with a further feature of the invention, a muffler 102 is provided within the breather conduit 96 between the inlet port 98 and the induction port 100 for silencing the sound produced by the sucking in of air into the power head. Preferably, the muffler 102 is located at the top wall 68 of the housing 64 to facilitate access to the muffler 10² or cleaning the muffler 102. The muffler 102 is constructed with a bottom wall 104 or floor, and a top wall 106, or roof, disposed parallel to the bottom Wall 104. The bottom wall 104 is fixed to the top wall 68 of the housing 64. The top wall 106 is removable for cleaning the muffler 102. A circuitous passage, in the form of a serpentine corridor, for the conduction of air is formed in the muffler 102 between the bottom wall 104 and the top wall 106. The serpentine corridor is connected serially with a lower tubular portion 108 and an upper tubular portion 110 of the air-breather conduit 96 to provide a continuous passage for the flow of air from the inlet port 98 to the induction port 100. A valve 112 is constructed at the inlet port 98 to permit manual adjustment of the rate of flow of air in the breather conduit 96. As a convenience in manufacture, the air-inlet port 98 and the valve 112 may be constructed as an integral assembly with the top wall 106 of the muffler 102.

FIGS. 10-15 show details in the construction of the muffler 102 and the valve 112 in accordance with a first embodiment of the muffler 102. The muffler 102 comprises a lower set of baffles 114 extending upwardly from the bottom wall 104, and an upper set of baffles 116 extending downwardly from the top wall 106 into the spaces between the lower baffles 114 to provide an intercalation of the baffles 114 and 116. The baffles 116 are spaced apart from the baffles 114 to provide space for the passage of air. Thereby, the interdigitated sets of baffles 114 and 116 form the serpentine corridor for conduction of the air through the muffler 102.

Figure 10:
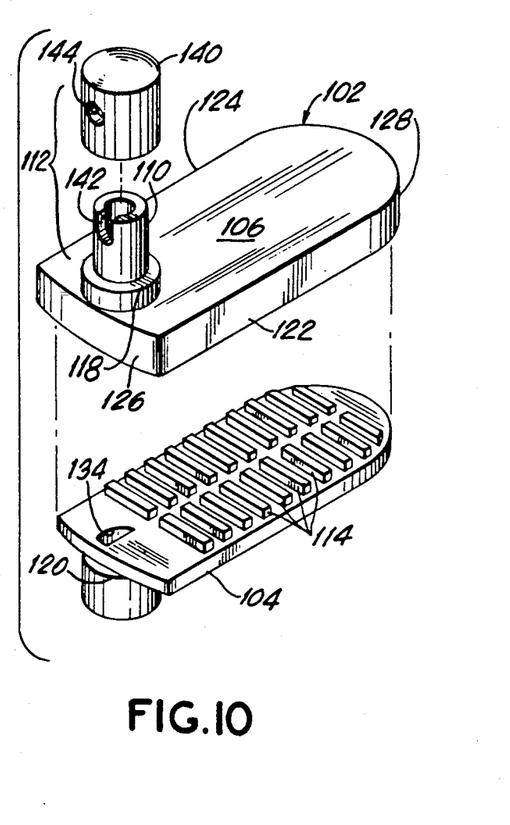
FIG. 10 is an exploded perspective view of a muffler situated at the top wall of the housing of FIG. 2, the view of FIG. 10 showing an array of baffles upstanding from a bottom surface of a duct carrying air in the air breather conduit.
Figure 11:
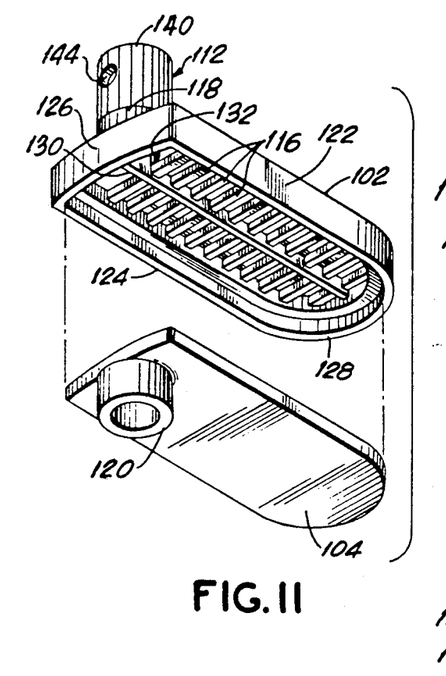
FIG. 11 is an exploded perspective view of the muffler, similar to the view of FIG. 10, but showing an array of baffles disposed along a top surface of the air carrying duct.
Figure 12:
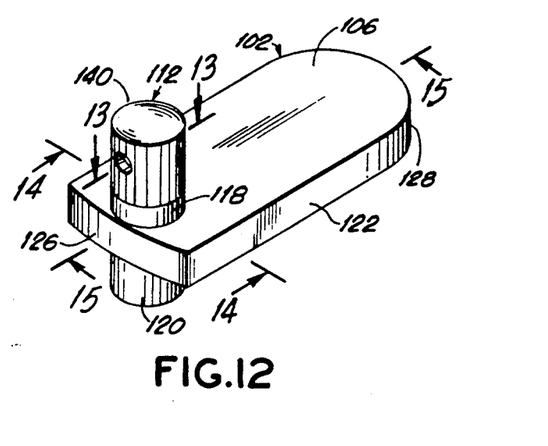
FIG. 12 is a perspective view of a completed assembly of the muffler of FIGS. 10 and 11, the view of FIG. 12 including a valve disposed at an input port of the muffler for selectively restricting a flow of air through the muffler.
Figure 13:
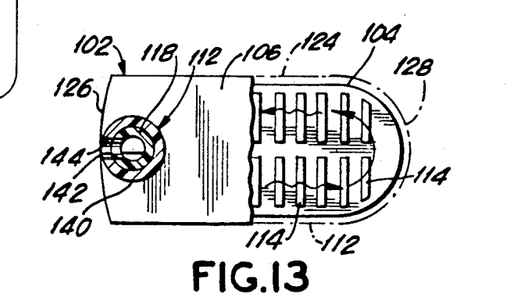
FIG. 13 is a plan view of the muffler of FIG. 12, a portion of the upper surface of the muffler being cut-away to disclose the baffles, there being arrows depicting a flow of air in an undulating course among the baffles.
Figure 14:
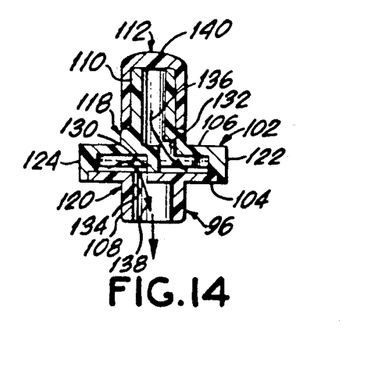
FIG. 14 is a sectional view of the muffler taken along the line 14—14 of FIG. 12, the view of FIG. 14 showing interior details in the construction of the valve, the view also showing a coaxial arrangement of input and output ports of the muffler including the central disposition of a partition to route air between the ports and the muffler.

The muffler 102 further comprises an input port 118 located on the top wall 106 and an output port 120 located on the bottom wall 104. Two opposed sidewalls 122 and 124 and two end walls 126 and 128 plus a central partition 130 extending in a longitudinal direction of the muffler 102 interconnect the top wall 106 with the bottom wall 104. The input port 118 and the output port 120 are fabricated each in the form of a circular cylindrical tubular segment. The input port 118 and the output port 120 are arranged coaxially to each other, and extend in opposite directions away from the muffler 102. The partition 130 extends through the common axis of the ports 118 and 120 to segregate air flow at the input port 118 to the portion of the muffler 102 between the partition 130 and the sidewall 122, and to segregate the air flow at the output port 120 to the portion of the muffler 102 between the partition 130 and the sidewall 124.

Furthermore, an opening 132 of the port 118 in the top wall 106 (FIG. 14 and partially shown in FIG. 11) and an opening 134 of the output port 120 in the bottom wall 104 (shown in FIGS. 10 and 14) are smaller than the areas of the cylindrical segments of the ports 118 and 120, and are offset to opposite sides of the common axis of the ports 118 and 120. This arrangement of the openings 132 and 134 provides for communication of the ports 118 and 120 only with the respective portions of the muffler 102 on opposite sides of the partition 130. Thus, the interior of the muffler 102 can be viewed as a duct extending from the input port 118 between the partition 130 and the sidewall 122, the duct bending back around the partition 130 at the end wall 128, and then continuing between the partition 130 and the sidewall 124 to the output port 120. Thus, the duct has a U-shaped configuration. Within the duct, the air flows in undulating fashion among the baffles according to the foregoing description of the serpentine corridor.

Communication of the input port 118 and the output port 120 to opposite sides of the partition 130 is shown best in FIG. 14. An arrow 136 passes through the opening 132 to indicate the flow of air from the input port 118 into the portion of the U-shaped duct defined by the top wall 106, the bottom wall 104, the partition 110, and the sidewall 122. An arrow 138 in the opening 134 indicates the flow of air into the output port 120 from the portion of the U-shaped duct defined by the top wall 106, the bottom wall 104, the partition 130, and the sidewall 124. In the view of FIG. 14, the opening 132 is displaced to the right of the common axis of the ports 118 and 120, and the opening 134 is displaced to the left of the common axis of the ports 118 and 120. FIG. 14 also shows the serial interconnection of the muffler 102 between the upper tubular portion 110 and the lower tubular portion 108 of the breather conduit 96.

Figure 15:
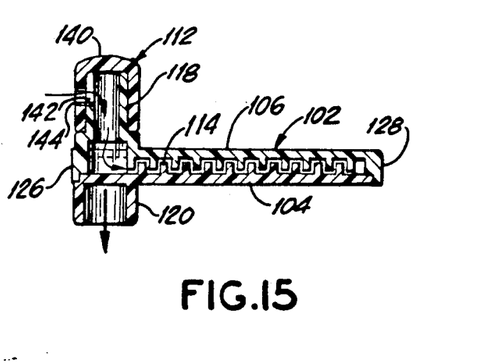
FIG. 15 is a sectional view of the muffler taken along the line 15—15 in FIG. 12, the figure showing an undulating course of flow for air provided by interdigitation of the baffles extending from top and bottom surfaces of the air-carrying duct.

The cross-sectional view of the muffler 102, presented in FIG. 15, demonstrates the flow of air through the muffler 102 in the undulating path of the serpentine corridor, the air flow undulating in an up and down motion along a vertical plane. FIG. 15 also shows the coaxial arrangement of the muffler ports 118 and 120. Arrows indicate the flow of air via the input port 118 into the muffler 102, and the outflow of air from the muffler 102 via the output port 120.

FIGS. 10 and 13-15 also show details in the construction of the valve 112. The valve 112 comprises a cylindrical cap 140 which encircles the tubular portion 110 of the breather conduit 96. The valve 112 includes a slot 142 cut into a sidewall of the tubular portion 110, and a circular aperture 144 disposed on a sidewall of the cap 140 in registration with the slot 142. The cap 140, the tubular portion 110, and the muffler input port 118 are disposed coaxially about a common axis. The cap 140 may be rotated manually about the common axis to align the aperture 144 with the slot 142 for a maximum flow of air through the valve 112 into the breather conduit 96. Further rotation of the cap 140 produces an offsetting of the aperture 144 relative to the slot 142 resulting in a constriction of the passage for air through the valve 112. The constriction of the passage for air through the aperture 144 reduces the flow of air through the valve 112 and the breather conduit 96. Thereby, by rotation of the cap 140, any desired rate of air flow can be selected up to the maximum value of the rate of flow.

As shown in FIGS. 10 and 11, the muffler 102 can be manufactured readily from two plastic parts, each of which is readily molded. One of these parts comprises the bottom wall 104 with the baffles 114 and the port 120 constructed thereon. The second part comprises the top wall 106 with the walls 122, 124, 126, and 128 plus the baffles 116 and the tubular portion 110 constructed upon the top wall 106. The walls 122, 124, 126, and 128 extend beyond the perimeter of the bottom wall 104 so as to grip the bottom wall 104 and thereby secure the top wall 106 in spaced-apart relation to the bottom wall 104. The muffler 102 can be opened for cleaning by lifting up on the semicircular end wall 128, to overcome the friction of the walls 122, 124, 126, and 128 with the bottom wall 104. This permits a cleaning of the spaces among the baffles 114 and among the baffles 116. After cleaning, the muffler 102 is readily reassembled by pressing the top wall 106 towards the bottom Wall 104 to secure the lower edges of the walls 122, 124, 126, and 128 to the perimeter of the bottom wall 104.

Figure 16:
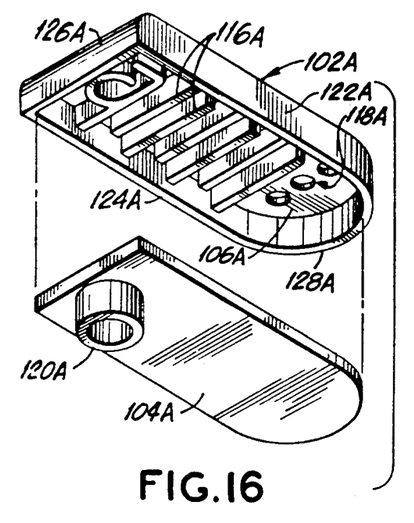
FIG. 16 is an exploded view of the muffler in accordance with a further embodiment having a linear form with input and output ports located at opposite ends of the muffler, the view showing baffles disposed on an upper surface of the air-carrying duct.
Figure 17:
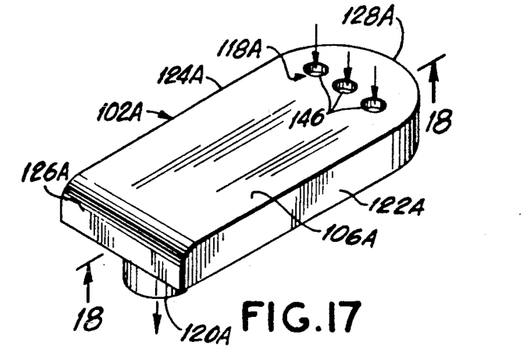
FIG. 17 is a perspective view of the muffler of FIG. 16, the view showing a top surface of the muffler.
Figure 18:
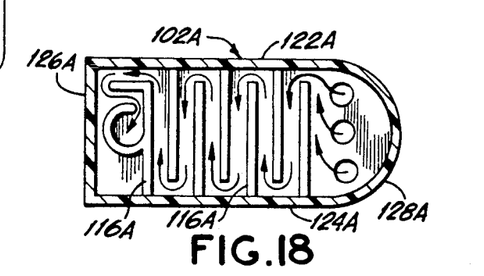
FIG. 18 is an sectional view of the muffler taken along the line 18—18 in FIG. 17 and looking towards the top surface the duct, the view showing interdigitation of the baffles by extension of the baffles from alternate sidewalls of the duct.

FIGS. 16-18 show a muffler 102A which is an alternative embodiment of the muffler 102 described above. In contrast to the U-shaped duct of the muffler 102, the muffler 102A is constructed with a linear duct bounded by a roof or top wall 106A and a floor or bottom wall 104A interconnected by sidewalls 122A and 124A and end walls 126A and 128A. The walls 104A and 106A are spaced apart from each other and are parallel to each other. Baffles 116A are disposed parallel to each other and extend from the top wall 106A to contact the bottom wall 104A. No baffles are present on the bottom wall 104A.

By way of contrast in the operation of the muffler 102 and in the operation of the muffler 102A, it is noted that while the undulations in the air conduction passage of the muffler 102 occur in an up and down fashion between floor and roof of the muffler 102, in the case of the muffler 102A, undulations in the air-flow passage occur from side to side between the sidewalls 122A and 124A. This is accomplished by extending the baffles 116A only partway from one of the sidewalls 122A or 124A to the other of the sidewalls 124A or 122A. By extending only partway to the opposite sidewall, each of the baffles 116A produces a window between the end of the baffle and the sidewall, the window also being bounded by the top wall 106A and the bottom wall 104A. The windows serve as a part of the corridor within the duct for conduction of the air. By alternating the locations of the windows with respect to the sidewalls 122A and 124A for successive ones of the baffles 116A, the baffles extending from one of the sidewalls are interdigitated with the baffles extending from the other of the sidewalls to provide a serpentine corridor for passage of the air between an input port 118A and an output port 120A of the muffler 102A. in view of the linear arrangement of the duct, the ports 118A and 120A are at opposite ends of the muffler 102A., the input port 118 being located adjacent the semicircular end wall 128A, and the output port 120A being located adjacent the end wall 126A.

The input port 118A may comprise a plurality of apertures such as the apertures 146. The output port 120A is a circular cylindrical section of tube communicating via a circular aperture in the bottom wall 104A to the interior of the muffler 102A. The apertures 146 are located in the opposite wall, namely the top wall 106A. The sidewalls 122A and 124A, and the end walls 126A and 128A extend from the top wall 106A to grip the perimeter of the bottom wall 106A by a friction fit. The walls 122A, 124A, 126A, and 128A can be urged manually away from the bottom wall 104A for cleaning the muffler 102A. A plan view of the air flow path among the interdigitated baffles, between the input port 118A and the output port 120A, is shown in FIG. 18.

Figure 19:
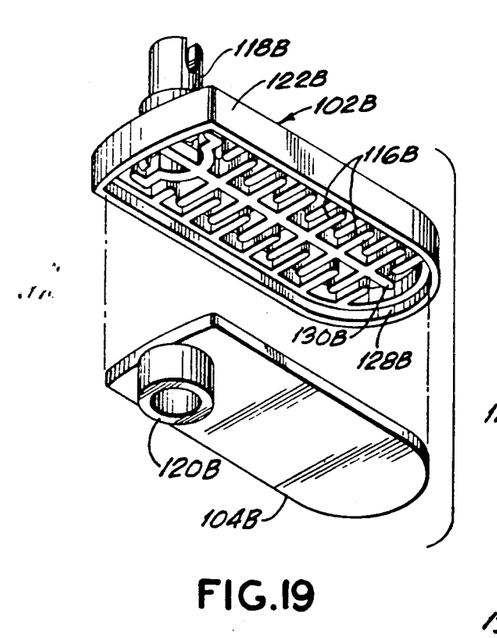
FIG. 19 shows an exploded view of the muffler in accordance with a further embodiment of the invention, similar to that of FIG. 18, but wherein the duct includes a central partition, this construction providing a U-shape flow arrangement to the air-carrying duct.
Figure 20:
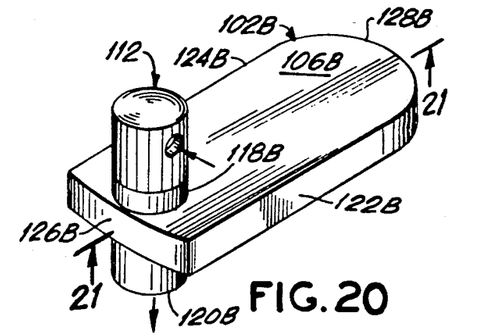
FIG. 20 is a perspective view of the muffler of FIG. 19.
Figure 21:
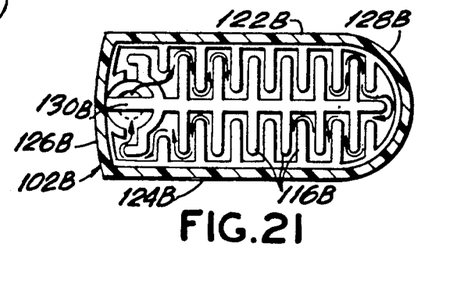
FIG. 21 is a sectional view taken along the line 21—21 of FIG. 20, and being directed towards an upper surface of a duct to disclose the arrangement of the baffles extending in alternating fashion from both the central partition and from an outer encircling sidewall.

FIGS. 19-21 show a muffler 102B which is another embodiment of the muffler 102. The muffler 102B includes certain features of the mufflers 102 and 102A, and differs in other respects from the mufflers 102 and 102A. The muffler 102B includes an air-carrying duct Which has a U-shape, similar to the duct of the muffler 102, the U-shape of the duct of a muffler 102B being provided by a partition 130B which extends in a longitudinal direction of the muffler 102B in a manner analogous to that of the partition 130 of the muffler 102. Within the muffler 102B, the air-flow passage follows a path which undulates in a side-to-side manner similar to the air-flow passage within the muffler 102A.

The muffler 102B comprises a top wall 106B and a bottom wall 104B, there being opposed sidewalls 122B and 124B, and two end walls 126B and 128B which extend from the top wall 106B to engage with and make frictional contact with the perimeter of the bottom wall 104B. An input port 118B is located on the top wall 106B, opens into the interior of the muffler 102B, and extends upwardly from the top wall 106B. An output port 120B is located on the bottom wall 104B, opens into the interior of the muffler 102B, and extends downwardly from the bottom wall 104B. The two ports 118B and 120B have a generally cylindrical tubular shape, and are positioned coaxially. Also included within the muffler 102B is a set of baffles 116B oriented transversely to the longitudinal partition 130B, the baffles 106B and the partition 130B extending from the top wall 106B to contact the bottom wall 104B.

The baffles 116B and the partition 130B are fully enclosed by the sidewalls 122B and 124B and the end walls 126B and 128B. The partition 130B in Cooperation with the sidewall 122B define an input branch of the air-carrying duct. The partition 13DB in cooperation with the sidewall 124B define an output branch of the air-carrying duct. The two branches of the duct are parallel to each other and are connected together by a passage defined by the semicircular end wall 128B to provide the U-shape to the duct. Within the input branch of the duct there are baffles 116B arranged serially with alternate ones of the baffles extending from the partition 130B partway to the sidewall 122B, the remaining baffles 116B extending from the sidewall 122B partway to the partition 130B. The baffles 116B extending from the partition 130B are disposed between and spaced apart from the baffles 116B extending from the sidewall 122B to provide for interdigitation of the baffles of the input branch of the air-carrying duct.

The same arrangement of baffles is provided in the output branch of the duct wherein alternate ones of the baffles 116B extend from the partition 130B partway towards the sidewall 124B, and the remaining baffles 116B extend from the sidewall 124B partway towards the partition 130. This provides for a serpentine corridor within the duct for the flow of air between the input port 118B and the output port 120B as shown in FIG. 21. In order to direct air from the input port 118B to the input branch of the duct, and in order to direct air from the output branch of the duct to the output port 120B, the two ports 118B and 120B are constructed, as described previously in FIG. 14, wherein the input and the output ports are provided respectively with reduced-size openings 132 and 134 disposed on opposite sides of the partition. The muffler 102B is operatively connected to the valve 112 in the same fashion as disclosed above for the muffler 102.

Figure 22:
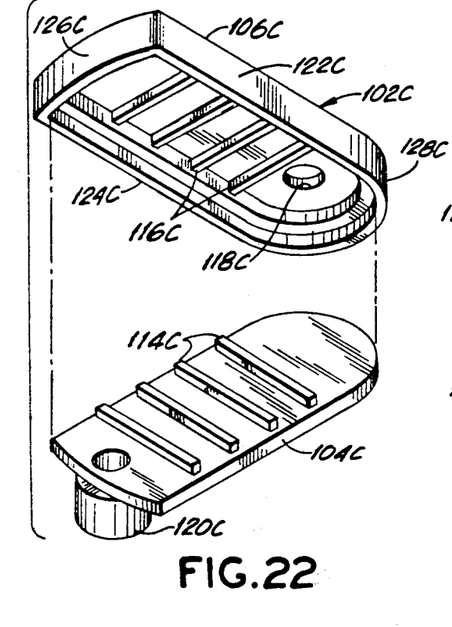
FIG. 22 is an exploded view of yet another embodiment of the muffler having a linear form with input and output ports located at opposite ends of the muffler, the view showing upper and lower portions of the muffler angled to disclose baffles extending from both upper and lower surfaces of an air-carrying duct.
Figure 23:
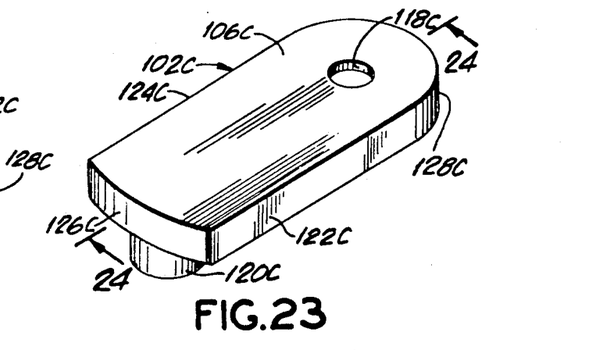
FIG. 23 is a perspective view of the muffler of FIG. 22, the view of FIG. 23 showing a top surface of the muffler.
Figure 24:
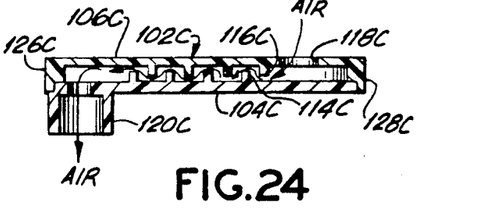
FIG. 24 is a sectional view of the muffler taken along the line 24—24 of FIG. 23, the view in FIG. 24 being taken along an elevation plane to show a serpentine passage for flow of air among the baffles.

FIGS. 22-24 show a muffler 102C which is a further embodiment of the muffler 102. The muffler 102C is similar to the muffler 102A in that both mufflers employ a linear duct between input and output ports disposed on opposite ends of the muffler. The muffler 1020 is similar to the muffler 102 in that both mufflers provide for an undulation of the air-flow path With the undulation occurring in a vertical plane between the roof and the floor of the muffler. The muffler 102C comprises a roof or top wall 106C and a floor or bottom wall 104C which is disposed parallel to and spaced apart from the top wall 106C. Sidewalls 122C and 124C and end walls 126C and 128C extend from the edges of the top wall 106C to engage with and to make frictional contact with the perimeter of the bottom wall 104C. As with the previously described embodiments of the muffler, the frictional contact between the sidewalls and the end walls with the bottom wall permits the muffler 102C to be opened manually for cleaning of the muffler.

The top wall 106C in cooperation with the bottom wall 104C and the sidewalls 122C and 124C define a duct for carrying air, the duct extending in a linear configuration from an input port 118C located adjacent the end wall 128C to an output port 120C located adjacent the opposite end wall 126C. The input port 118C is configured as a single aperture in a top wall 106C. The output port 120C has a circular cylindrical configuration and opens via a circular aperture in the bottom wall 104C into the interior of the muffler 102C . A set of baffles 116C is disposed on the top wall 106C, and a set of baffles 114C is disposed on the bottom wall 104C. The baffles 114C and 116C are oriented transversely to the longitudinal direction of the duct. The baffles 116C extend from the wall 106C partway to the wall 104C. The baffles 114C extend from the wall 104C partway to the wall 106C, and are disposed between and apart from the baffles 116C. The arrangement of the baffles 114C and 116C provide an undulating passage for the flow of air, the passage having the configuration of a serpentine corridor as depicted in FIG. 24. FIG. 24 also shows arrows representing the flow of air via the inlet port 118C into the serpentine corridor followed by an exiting of the air via the output port 120C.

In each of the embodiments of the muffler, the walls, the baffles, and the muffler ports may be fabricated of plastic or rubber, both of these materials permitting manufacture by a process of molding the components of the muffler. The housing of the pump assembly may be fabricated of the same material employed in the fabrication of the muffler. In accordance with the practice in the construction of aquariums, the plastic or rubber materials employed in the manufacture of aquarium components are nontoxic to aquatic life. Such plastic or rubber is to be employed in the construction of the pump housing 64, the muffler 102 in its various embodiments, and the valve 112.

Figure 25:
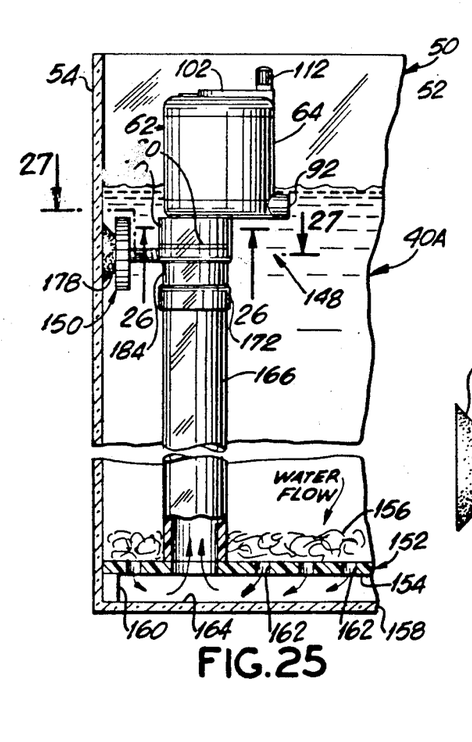
FIG. 25 shows a side elevation view of the power head assembly, and includes a description of the mounting of the pump head to an interior wall surface of an aquarium tank, and connection of an inlet water port of the power head to a riser tube of an undergravel filter.

FIG. 25 shows a fragmentary view of an aquarium 40A including a filter system 148 including the power head 62 with a muffler 102, as in the present invention. A further feature of the invention, namely, a clamp 150 is provided. The clamp 150 is adjustable for selecting a suitable location for the power head 62 in the tank 50 and for securely holding the power head 62 in a selected location.

The aquarium 40A includes an undergravel filter 152 of conventional design, the filter 152 Comprising a plate 154 and a bed of filter material 156 supported on the plate 154. The plate 154 is supported spaced apart from and parallel to a bottom 158 of the tank 50 by posts 160 (one of which is shown in FIG. 25). The plate 154 has apertures 162 to allow water to flow through the filter material 156 into a chamber 164 of clean water beneath the plate 154, the water being pulled from the chamber 164 through a riser tube 166 to the water inlet port 90 of the power head 62. By operation of the power head 62, the water is drawn through the riser tube 166, is aerated, and then is expelled via the water outlet port 92 back into the main body of water of the aquarium 40A.

Figure 26:
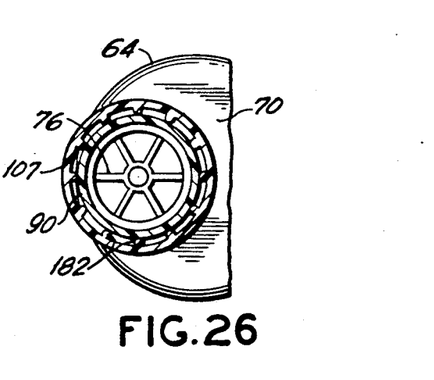
FIG. 26 is a sectional view showing connection of a clamp of FIG. 25 to an inlet port of the power head, the view of FIG. 26 being taken along the line 26—26 of FIG. 25.
Figure 27:
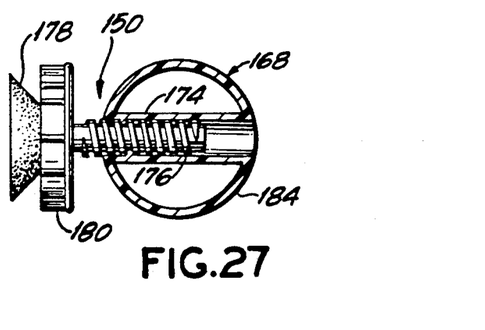
FIG. 27 is a sectional view, taken along the line 27—27 of FIG. 25, and showing details in the construction of the clamp, the clamp holding the power head at a selectable distance from the tank wall of FIG. 25.

In accordance with a further feature of the invention, as shown in FIGS. 25-27, the clamp 150 comprises a circular cylindrical ring assembly 168 having an upper flange 170 for engagement with the water inlet port 90 of the power head 62, and a lower flange 172 for engagement with the upper end of the riser tube 166. Centrally disposed within the ring assembly 168 is an internally threaded tube 174 and a threaded shaft 176 which engages with an interior threaded surface of the tube 174. Rotation of the shaft 176 about its longitudinal axis advances the shaft 176 along the tube 174. A flexible suction cup 178 and a knob 180 are mounted coaxially to an end of the shaft 176 extending outward of the tube 174. The knob 180 is securely fastened to the shaft 176 so that rotation of the knob 180 is imparted to the shaft 176 for advancing the shaft 176 along the tube 174. The knob 180 is readily grasped by a person to allow the person, by rotation of the knob 180, to adjust the position of the suction cup 178 relative to the ring assembly 168. The upper flange 170 of the ring assembly 168 may be provided with an array of inwardly extending teeth 182 (FIG. 26) for secure engagement of the upper flange 170 with the outer surface of the water inlet port 90 of the pump assembly 62. The suction cup 178 is held on the end of the shaft 176 by a lip which permits the shaft 176 to rotate independently of the cup 178 thereby to permit adjustment of the location of the ring assembly 168 while the suction cup 178 adheres to the tank wall 54.

The operation of the clamp 150 is explained with reference to FIGS. 25 and 27. FIG. 27 is particularly useful for explaining the operation of the threaded shaft 176 within the threaded tube 174, the tube 174 being sectioned in FIG. 27 to show threading on the shaft 176. The tube 174 extends diametrically across a central ring 184 of the ring assembly 168. In the operation of the ring assembly 168, the lower flange 172 is placed upon the upper end of the riser tube 166, the upper flange 170 is secured about the water-inlet port 90 of the pump assembly 62, and then the knob 180 is rotated to position the suction cup 178 relative to the ring assembly 168. The suction cup 178 is then pressed against the tank wall 54 to secure the clamp 150 to the tank wall 54. Thereupon, the knob 180 may be rotated further for final adjustment of the position of the power head 62 relative to the tank wall 54. This places the power head 62 in the position indicated in FIG. 3. The riser tube 166 may be fabricated of a plastic which can be placed appropriately to the undergravel filter.

Figure 28:
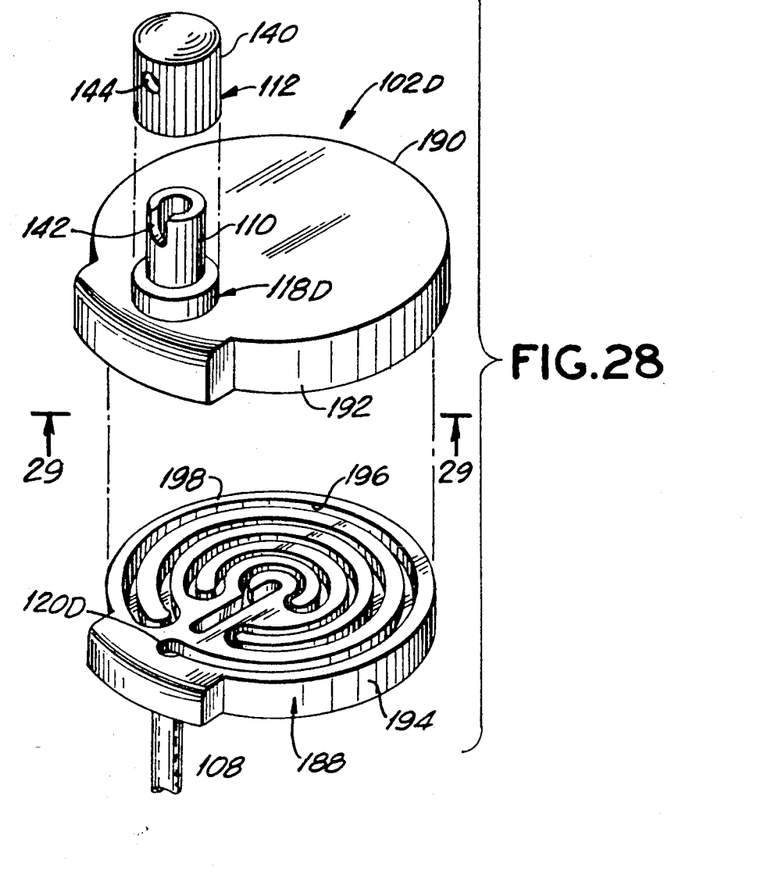
FIG. 28 is an exploded view of another embodiment of the muffler wherein the air-carrying duct has been made circular to provide a serpentine duct configuration composed of a series of circular segments of different radii.
Figure 29:
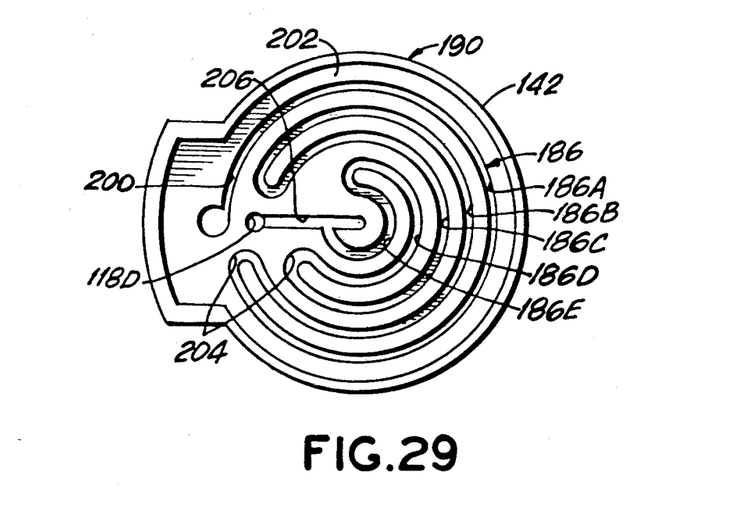
FIG. 29 is a sectional view of the muffler taken along the line 29—29 of FIG. 28, the view of FIG. 29 showing a plan view of an upper portion of the muffler of FIG. 28.

FIGS. 28 and 29 show a muffler 102D which is yet another embodiment of the muffler 102 described above. Instead of employing the baffles of the previous embodiments of the muffler to provide the serpentine corridor, the muffler 102D employs a sequence of arcuate passages of differing radii of curvature. The arcuate passages, indicated generally at 186, are connected serially to provide for a serpentine corridor for conducting air between an input port 118D and an output port 120D of the muffler 102D. The input port 118D extends into the upper tubular portion 110 and the output port 120D extends into the lower tubular portion 108 of the air-breather conduit 96 (FIG. 8). The muffler 102D Comprises a circular base 188 and a circular cover 190 disposed on top of the base 188 and having a circular sidewall 192 extending from the cover 190 to overlap and make frictional contact with an outer peripheral surface 194 of the base 188. The frictional contact between the sidewall 192 and the peripheral surface 194 permits the cover 190 to be lifted manually away from the base 188 to permit cleaning of the muffler 102D.

Each of the arcuate passages 186 is formed partially by a continuous groove 196 formed in an upper surface 198 of the insert 188 and a continuous rib 200 formed in a lower surface 202 of the cover 199. The groove and rib 196 and 200 are matingly arranged and are disposed in registration with each other so that the ribs partially enter the grooves to form the serpentine corridor comprising the series of the arcuate passages 186. Individual ones of the arcuate passages 186 are indicated in FIG. 29, in sequence of progressively smaller radii, by passages 186A-E. Successive ones of the arcuate passages 186 are connected by U-shaped end passages 204 of smaller radii than the arcuate passage 186E. One end of the passage 186A connects with the output port 120D. One end of the passage 186E connects via a straight passage 206 to the input port 118D. The base 188 and the cover 190 may be fabricated of plastic or rubber material which facilitates manufacture by a molding process as has been described for the other embodiments of the muffler 102.

The views of FIG. 28 and 29 are drawn magnified, by a factor of approximately two times the actual size of the muffler 102D. The diameter of the largest arcuate passage 186A has a length of approximately one inch. This is substantially smaller than a wavelength of the sound emitted by the sucking in of the air. For example, at a sonic frequency of 1000 hertz, the wavelength is approximately one foot which is an order of magnitude greater than the diameter of the arcuate passage 186A. Thus, it is appreciated that the length of the various passages 186 are much smaller than that which is required for the construction of sonically resonant chambers as is done, by way of example, in the construction of mufflers for automotive engines. All embodiments of the muffler 102 operate in a non-resonant mode. The cross-sectional dimension of a passage 186 measures approximately 1 millimeter, a measure which is sufficiently small such that the passages 186 may be viewed acoustically as a capillary passage. Acoustic waves are rapidly attenuated in such a narrow passage and, accordingly, the muffler 102D is effective in silencing the sound of the incoming air. Similar cross-sectional dimensions are found in the other embodiments of the muffler 102. Also, the lengths of segments of the air transmission passages of the other embodiments of the muffler 102 are also much smaller than a wavelength of the sound. Therefore, all embodiments of the invention operate in a nonresonant mode and serve to attenuate rapidly the sound produced by the incoming air.

The height of the muffler 102D, as measured along a central cylindrical axis, is much smaller than the outer diameter of the cover 190 to provide the muffler 102D with a low-profile configuration. The low-profile configuration and the overall dimensions of the muffler 102D allow the muffler 102D to be formed on top of, or as a part of, the top wall 68 (FIG. 8) of the housing 64. Thus, all embodiments of the muffler 102 can be formed as an integral part of the housing 64.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An aquarium power head for pumping water through a filter system to return it to the aquarium and for aerating the returned water, the power head comprising:
    a pump and a housing enclosing said pump;
    a water conduit located within said housing,
    said pump having an impeller extending into said conduit for urging water of the tank to flow through said conduit;
    an air breather conduit provided within said housing and communicating with said water conduit and extending from said water conduit to a source of entering air so that a flow of the water through said water conduit entrains air from said breather conduit into the water in said water conduit; and
    wherein said breather conduit comprises a nonabsorbant muffler for silencing sound emitted by the entraining of the air in the water.

2. An aquarium power head for pumping water through a filter system to return it to the aquarium and for aerating the returned water, the power head comprising:
    a pump and a housing enclosing said pump;
    a water conduit located within said housing,
    said pump having an impeller extending into said conduit for urging water of the tank to flow through said conduit;
    an air breather conduit located within said housing and communicating with said water conduit and extending from said water conduit to a source of entering air so that a flow of the water through said water conduit entrains air from said breather conduit into the water in said water conduit; and
    wherein said breather conduit comprises a nonabsorbent muffler integral with said housing for silencing sound emitted by the entraining of the air in the water.

3. An assembly according to claim 2, wherein said muffler comprises a serpentine corridor.

4. An assembly according to claim 3, wherein said serpentine corridor comprises a circular path, with the path doubling back around itself to provide a series of concentric circles.

5. An assembly according to claim 2 further comprising a sequence of arcuate passages having differing radii of curvature, said arcuate passages being serially connected to define a serpentine corridor.

6. An assembly according to claim 5, wherein said arcuate passages are disposed side-by-side to provide a low-profile configuration to the muffler, the low-profile configuration permitting a nesting of said muffler within an outer wall of said housing.

7. An assembly according to claim 6, wherein one of said arcuate passages is nested within the next of said arcuate passages of said sequence, all of said arcuate passages being disposed in a common plane for a low-profile configuration, said muffler comprising a base portion and a cover portion which are separable at said common plane to permit a cleaning of the muffler.

8. An assembly according to claim 6 further comprising:
    a plurality of U-shaped passages; and
    wherein each of said arcuate passages is connected to another of said arcuate passages by one of said U-shaped passages.

9. An assembly according to claim 8 further comprising an inlet port and an outlet port for the conduction of air through said duct, said inlet port extending outward from said housing, and said outlet port extending within said housing to an air entraining apparatus, said inlet port including a valve accessible outside of said housing for adjusting a flow rate of the air conducted through said serpentine corridor.

10. An assembly according to claim 9, wherein each of said U-shaped passages has a radius of curvature smaller than any of the radii of curvature of said arcuate passages.

11. An assembly according to claim 3 further comprising an array of interdigitated baffles, the baffles being spaced apart to define said serpentine corridor for conducting air from said source to said water conduit.

12. An assembly according to claim 11, wherein said muffler has an elongated cross section defined by parameters of width and height, the width being greater than the height to provide a low-profile configuration to the muffler, the baffles being disposed perpendicularly to a plane of said muffler.

13. An assembly according to claim 12, wherein said baffles are elongated in a direction of said muffler plane, said muffler comprising a floor and a roof parallel to said muffler plane, said baffles extending from said floor to said roof, said corridor passing around an end of each baffle.

14. An assembly according to claim 12, wherein said baffles are elongated in a direction of said muffler plane;
    said muffler comprises a floor, a roof, and sidewalls connecting between said floor and said roof, said floor and said roof being parallel to said muffler plane;

said baffles extend from a first of said sidewalls to a second of said sidewalls opposite said first sidewall; and alternate ones of said baffles extend from said floor to form windows with said roof, the remaining ones of said baffles extending from said roof to form windows with said floor, said corridor passing through said windows.

15. An assembly according to claim 12, wherein said baffles are elongated in a direction of said muffler plane; said baffles extend from said floor to said roof; and alternate ones of said baffles extend from a first of said sidewalls to form windows with a second of said sidewalls opposite said first sidewall, the remaining ones of said baffles extending from said second sidewall to form windows with said first sidewall, said corridor passing through said windows.

16. An assembly according to claim 2, wherein said housing has the shape of a circular cylinder to avoid trapping and suffocating fish between the housing and a wall of the aquarium tank.

17. A muffler in combination with an aquarium power head and forming a part of an air breather conduit in the aquarium power head, the power head including a housing and means for sucking air into the breather conduit for entrainment with a stream of water flowing back into the aquarium, said air breather conduit being provided within said housing and communicating with said sucking means, the muffler silencing sound emitted by the sucked air, the muffler comprising:

a sequence of arcuate passages having differing radii of curvature, said arcuate passages being serially connected to define a serpentine corridor for the conduction of air.

18. A muffler according to claim 17, wherein said arcuate passages are disposed side-by-side to provide a low-profile configuration to the muffler, the low-profile configuration permitting a nesting of said muffler within an outer wall of said housing.

19. A muffler according to claim 18, wherein one of said arcuate passages is nested within the next of said arcuate passages of said sequence, all of said arcuate passages being disposed in a common plane for a low-profile configuration, said muffler comprising a base portion and a cover portion which are separable at said common plane to permit a cleaning of the muffler.

20. A muffler according to claim 19 further comprising:

a plurality of U-shaped passages; and wherein each of said arcuate passages is connected to another of said arcuate passages by one of said U-shaped passages.

21. A muffler according to claim 20 further comprising an inlet port and an outlet port for the conduction of air through said duct, said inlet port extending outward from said housing, and said outlet port extending within said housing to said air entraining apparatus, said inlet port including a valve accessible outside of said housing for adjusting a flow rate of the air conducted through said serpentine corridor.

22. A muffler according to claim 21, wherein each of said U-shaped passages has a radius of curvature smaller than any of the radii of curvature of said arcuate passages.

23. A muffle in combination with an aquarium power head and forming a part of an air breather conduit in the aquarium power head, the power head including a housing and means for sucking air into the breather conduit for entrainment within a stream of water flowing back into the aquarium, said air breather being provided within said housing and communicating with said sucking means, the muffler silencing sound emitted by the sucked in air, the muffler comprising:

a duct for conduction of air; and an array of baffles disposed within said duct and oriented transversely of a central axis of said duct, said baffles being interdigitated and spaced apart from each other to define a serpentine corridor for the conduction of air in the duct.

24. A muffler according to claim 23, wherein said power head comprises a housing; and said cut has an elongated cross section defined by parameters of width and height, the width being greater than the height to provide a low-profile configuration to the muffler, the low-profile configuration permitting a nesting of said muffler within an outer wall of said housing.

25. A muffler according to claim 24 further comprising an inlet port and an outlet port for the conduction of air through said duct, said inlet port extending outward from said housing, and said outlet port extending within said housing to said stream of water, said inlet port including a valve accessible outside of said housing for adjusting a flow rate of the air conducted through said duct.

26. A power head for an aquarium tank, the power head comprising:

a pump for pumping water of the aquarium tank;

a water conduit; and a housing enclosing said pump and said water conduit, said housing having an inlet port for receiving water and an outlet port for discharging water, said pump and said conduit being serially connected between said inlet port and said outlet port;

wherein said housing has substantially the shape of a circular cylinder to avoid trapping fish between the housing and a wall of the aquarium tank; and an air breather conduit communicating with said water conduit for mixing air with the water, said breather conduit being disposed within said housing and entraining air into said water conduit;

said breather circuit comprising a non-absorbant muffler for silencing sound emitted by the mixing of air with the water, said muffler being located on an outer wall of said housing.

27. An aquarium power head for pumping water through a filter system to return it to the aquarium and for aerating the returned water, the power head comprising:

a pump and a housing enclosing said pump;

a water conduit located within said housing, said pump having an impeller extending into said conduit for urging water of the tank to flow through said conduit; and an air breather conduit communicating with said water conduit and extending from said water conduit to a source of entering air, a flowing of the water through said water conduit entraining air from said breather conduit into the water in said water conduit; and wherein said breather conduit comprises a muffler integral with said housing for silencing sound emitted by the entraining of the air in the water.

said muffler comprising a circular path, with the path doubling back around itself to provide a series of concentric circles.

28. An aquarium power head for pumping water through a filter system to return it to the aquarium and for aerating the returned water, the power head comprising:

a pump and a housing enclosing said pump;

a water conduit located within said housing, said pump having an impeller extending into said conduit for urging water of the tank to flow through said conduit; and an air breather conduit communicating with said water conduit and extending from said water conduit to a source of entering air, a flowing of the water through said water conduit entraining air from said breather conduit into the water in said water conduit; and wherein said breather conduit comprises a muffler integral with said housing for silencing sound emitted by the entraining of the air in the water, said muffler comprising a serpentine corridor including a sequence of arcuate passages having differing radii of curvature, said arcuate passages being serially connected to define said serpentine corridor.

* * * * *